US011754105B2

(12) United States Patent
Lee et al.

(10) Patent No.: US 11,754,105 B2
(45) Date of Patent: Sep. 12, 2023

(54) CONNECTING DEVICE FOR CABLES

(71) Applicant: DAECHANG SEAT CO., LTD-DONGTAN, Gyeonggi-do (KR)

(72) Inventors: Myung Soo Lee, Gyeonggi-do (KR); Jeong Soo Kim, Busan (KR); Jun Kyu Park, Gyeonggi-do (KR)

(73) Assignee: Daechang Seat Co., Ltd-Dongtan, Hwaseong-si (KR)

( * ) Notice: Subject to any disclaimer, the term of this patent is extended or adjusted under 35 U.S.C. 154(b) by 528 days.

(21) Appl. No.: 16/798,886

(22) Filed: Feb. 24, 2020

(65) Prior Publication Data
US 2020/0284283 A1 Sep. 10, 2020

(30) Foreign Application Priority Data

Mar. 8, 2019 (KR) .................. 10-2019-0026696

(51) Int. Cl.
*F16B 7/04* (2006.01)
*B60N 2/20* (2006.01)
(Continued)

(52) U.S. Cl.
CPC .............. *F16B 7/0406* (2013.01); *B60N 2/20* (2013.01); *F16G 11/02* (2013.01); *F16G 11/12* (2013.01)

(58) Field of Classification Search
CPC . B60N 2/20; B60N 2/36; B60N 2/502; B60N 2205/40; F16G 11/02; F16G 11/12;
(Continued)

(56) References Cited

U.S. PATENT DOCUMENTS 4,992,629 A * 2/1991 Morais ................. H02G 15/007
267/74
7,927,036 B2 * 4/2011 Reasoner ................ F16G 11/10
403/90
(Continued)

FOREIGN PATENT DOCUMENTS

CH 676489 A5 * 11/1987
JP H05-032820 U 4/1993
(Continued)

OTHER PUBLICATIONS

Office Action for Japanese Application No. 2020-027243, dated Jan. 28, 2021, 5 pages.
(Continued)

*Primary Examiner* — Robert Sandy
*Assistant Examiner* — Louis A Mercado
(74) *Attorney, Agent, or Firm* — Lippes Mathias LLP

(57) ABSTRACT

Disclosed in the present specification is to provide a connecting device for cables, in which a connecting portion and a length adjusting portion for connecting the cables are provided to be separated from each other, and a cable of a seat side and the connecting portion are easily attached to and detached from each other. According to one embodiment of the disclosure disclosed herein, proposed is a connecting device for cables, connecting a first cable connected to a folding unit of a seat of a first direction side and a third cable connected to a switch portion at a second direction side opposite to the first direction, the device including: a connecting portion; and a length adjusting portion.

10 Claims, 9 Drawing Sheets

(51) Int. Cl.
*F16G 11/02* (2006.01)
*F16G 11/12* (2006.01)

(58) Field of Classification Search
CPC ........ H02G 15/08; B62D 25/12; E05B 79/20; F16B 7/0406; F16B 2/245
See application file for complete search history.

(56) References Cited

U.S. PATENT DOCUMENTS

| | | | | |
|---|---|---|---|---|
| 8,845,026 | B2* | 9/2014 | Kobayashi | B60N 2/3065 |
| | | | | 296/65.09 |
| 9,121,439 | B2* | 9/2015 | Schimings | F16C 1/262 |
| 10,668,836 | B2* | 6/2020 | Di Giusto | B60N 2/686 |
| 10,703,240 | B2* | 7/2020 | Di Giusto | B60R 22/26 |
| 2005/0023877 | A1* | 2/2005 | Vermeulen | B60N 2/0232 |
| | | | | 297/378.13 |
| 2008/0110000 | A1* | 5/2008 | Orr | F16G 11/12 |
| | | | | 24/130 |
| 2020/0269725 | A1* | 8/2020 | Williams | B60N 2/20 |

FOREIGN PATENT DOCUMENTS

| | | |
|---|---|---|
| JP | H05-067811 U | 9/1993 |
| JP | 2006038217 A | 2/2006 |
| JP | 2016011695 A | 1/2016 |
| JP | 2017089796 A | 5/2017 |
| KR | 20100136577 A | 12/2010 |
| KR | 101075191 A | 10/2011 |
| KR | 20130062688 A | 6/2013 |
| KR | 1020150082004 A | 7/2015 |
| KR | 1020160019620 A | 2/2016 |
| KR | 101771074 B1 | 8/2017 |

OTHER PUBLICATIONS

Decision to Grant a Patent for Japanese Application No. 2020-027243, dated Aug. 25, 2021, 3 pages.
Office Action for Korean Application No. 10-2019-0026696, dated Sep. 21, 2020, 3 pages.
Decision to Grant a Patent for Korean Application No. 10-2019-0026696, dated Mar. 9, 2021, 1 page.
Office Action for Chinese Application No. 202010101669.5, 4 pages.

* cited by examiner

[Fig. 1]
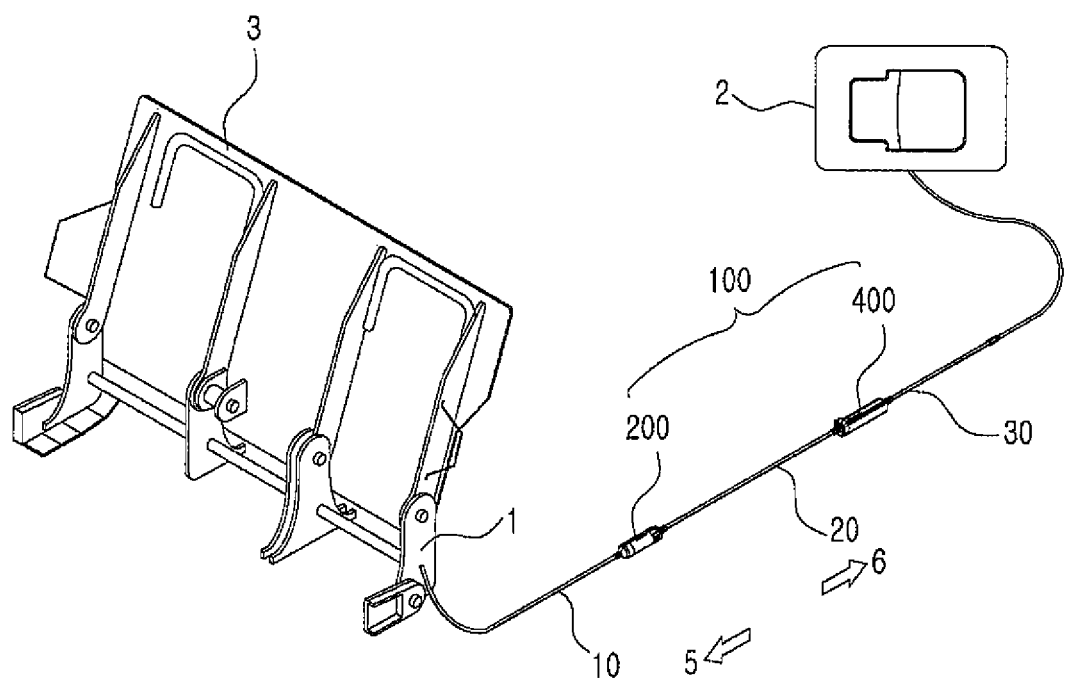

[Fig. 2]
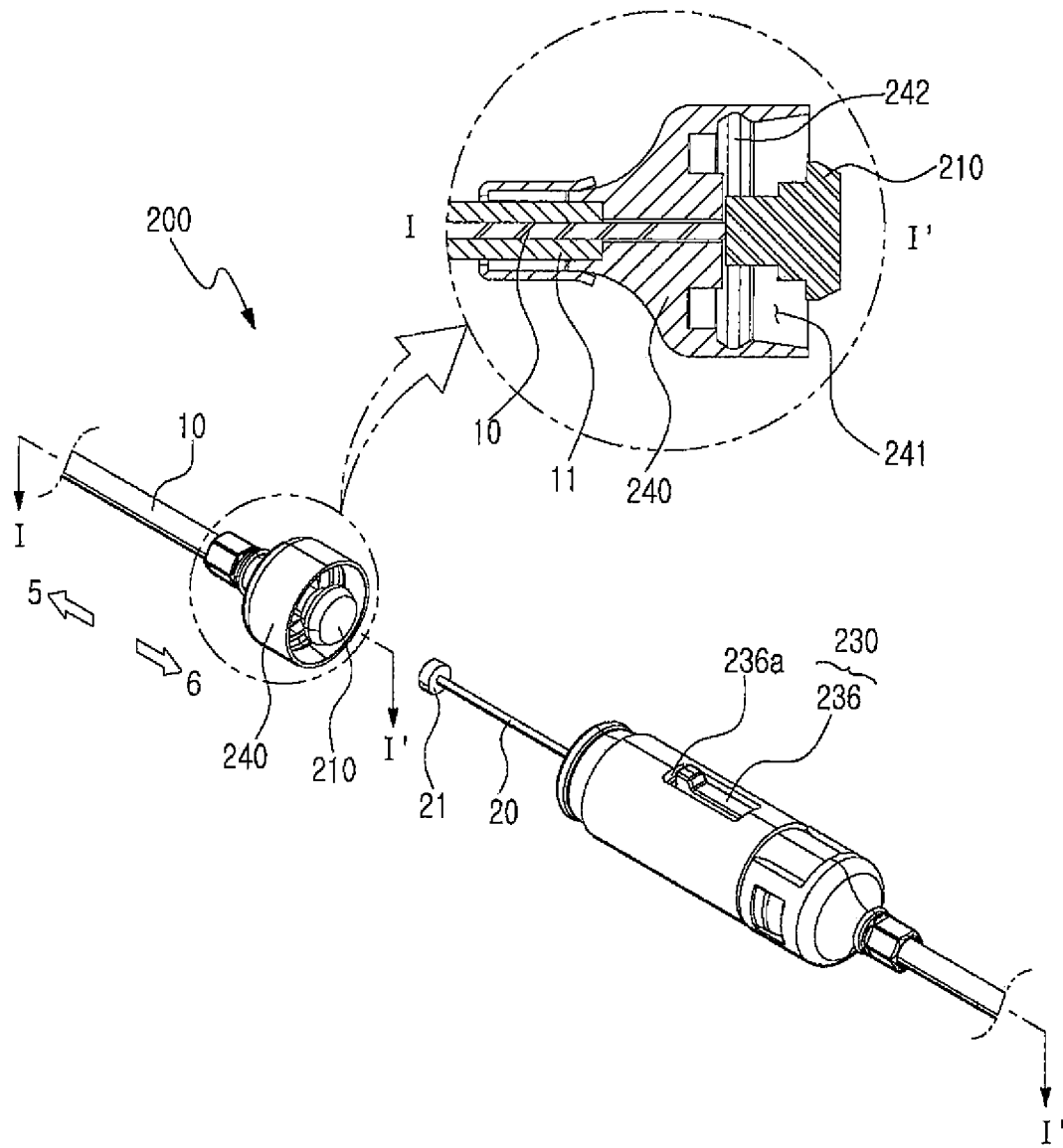

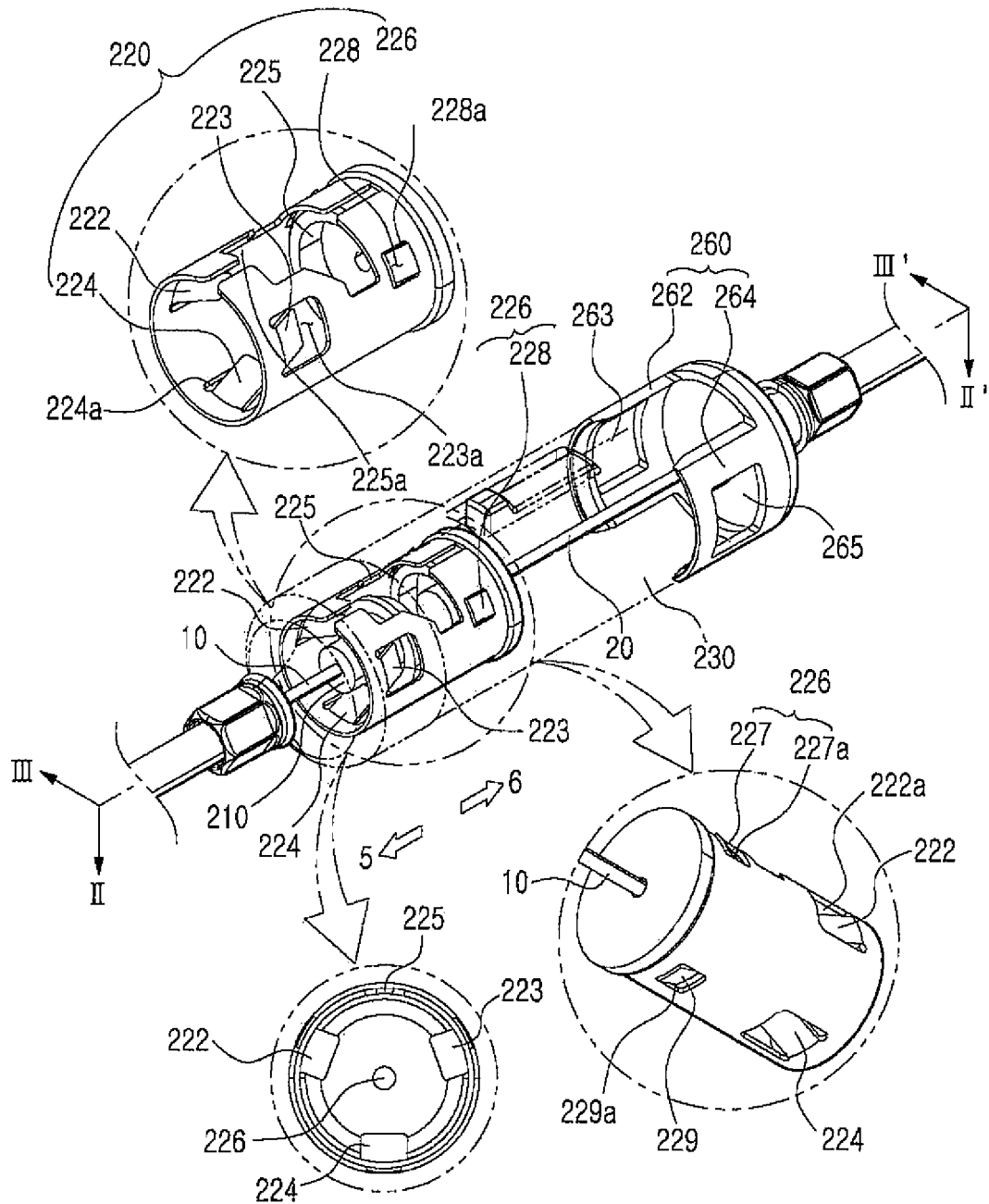
[Fig. 3]

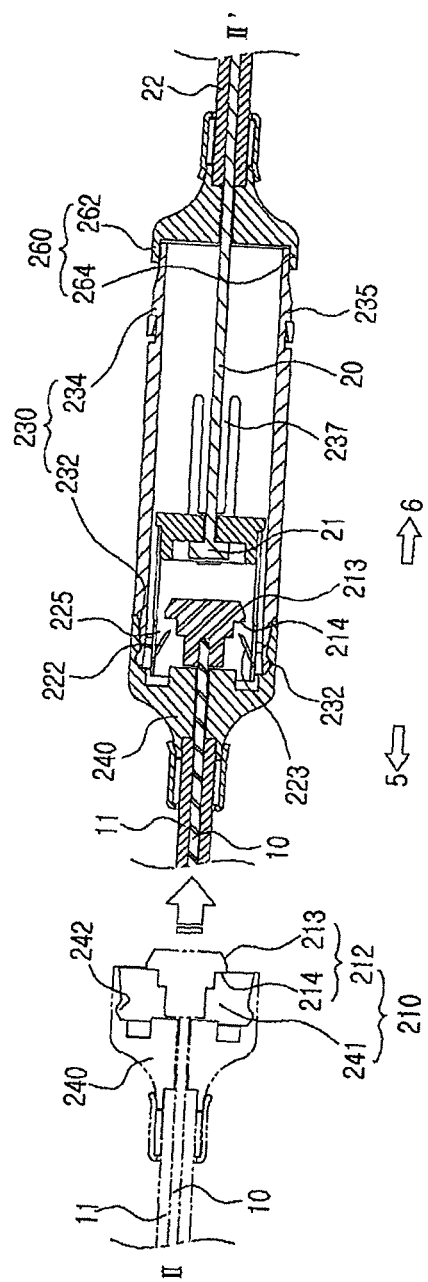
(Fig. 4)

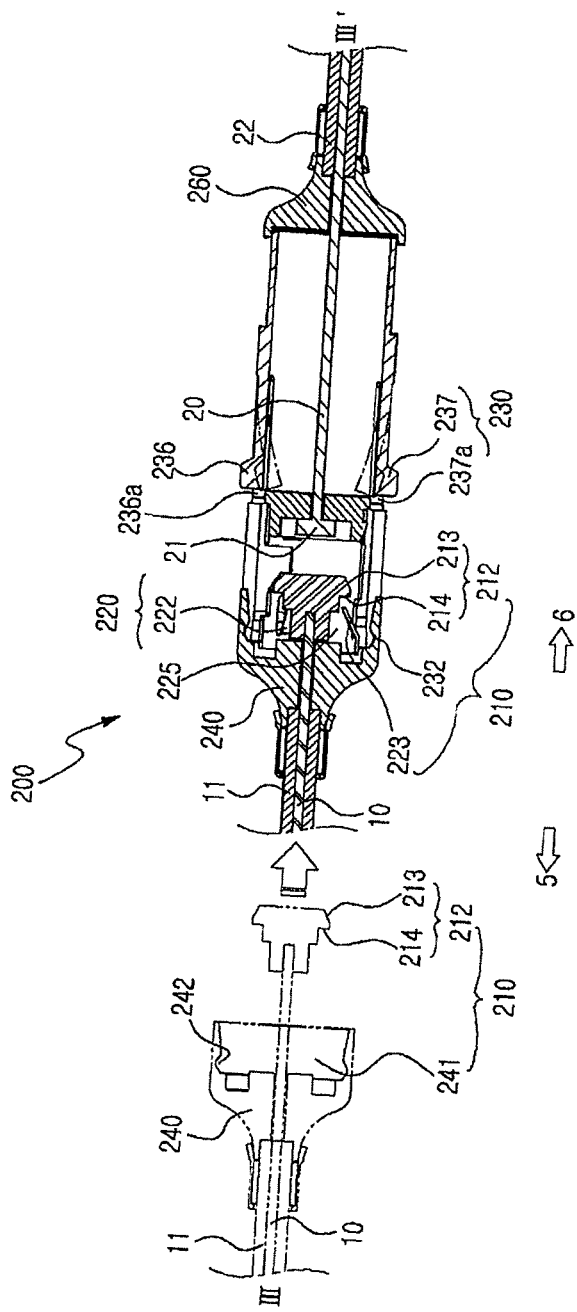
(Fig. 5)

[Fig. 6]
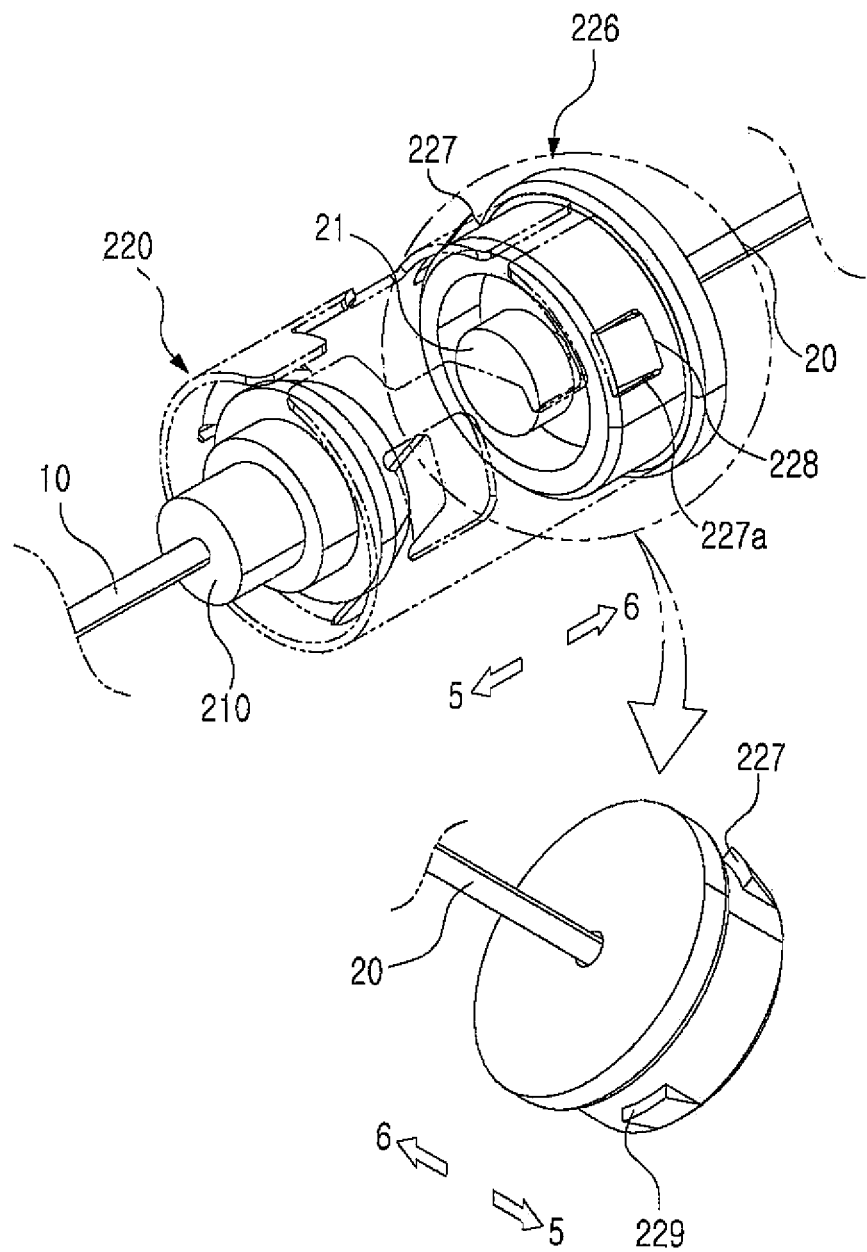

[Fig. 7]
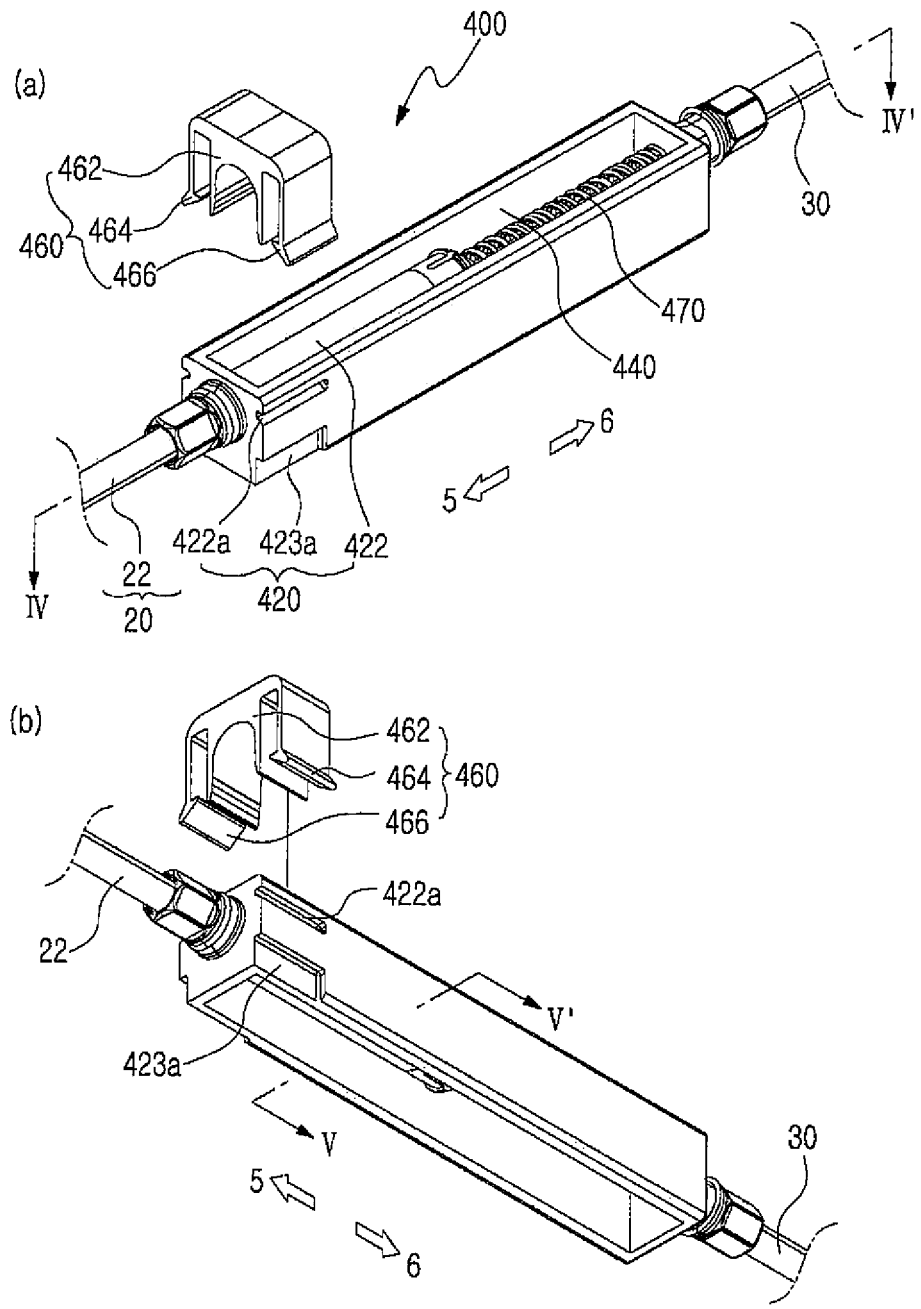

[Fig. 8]
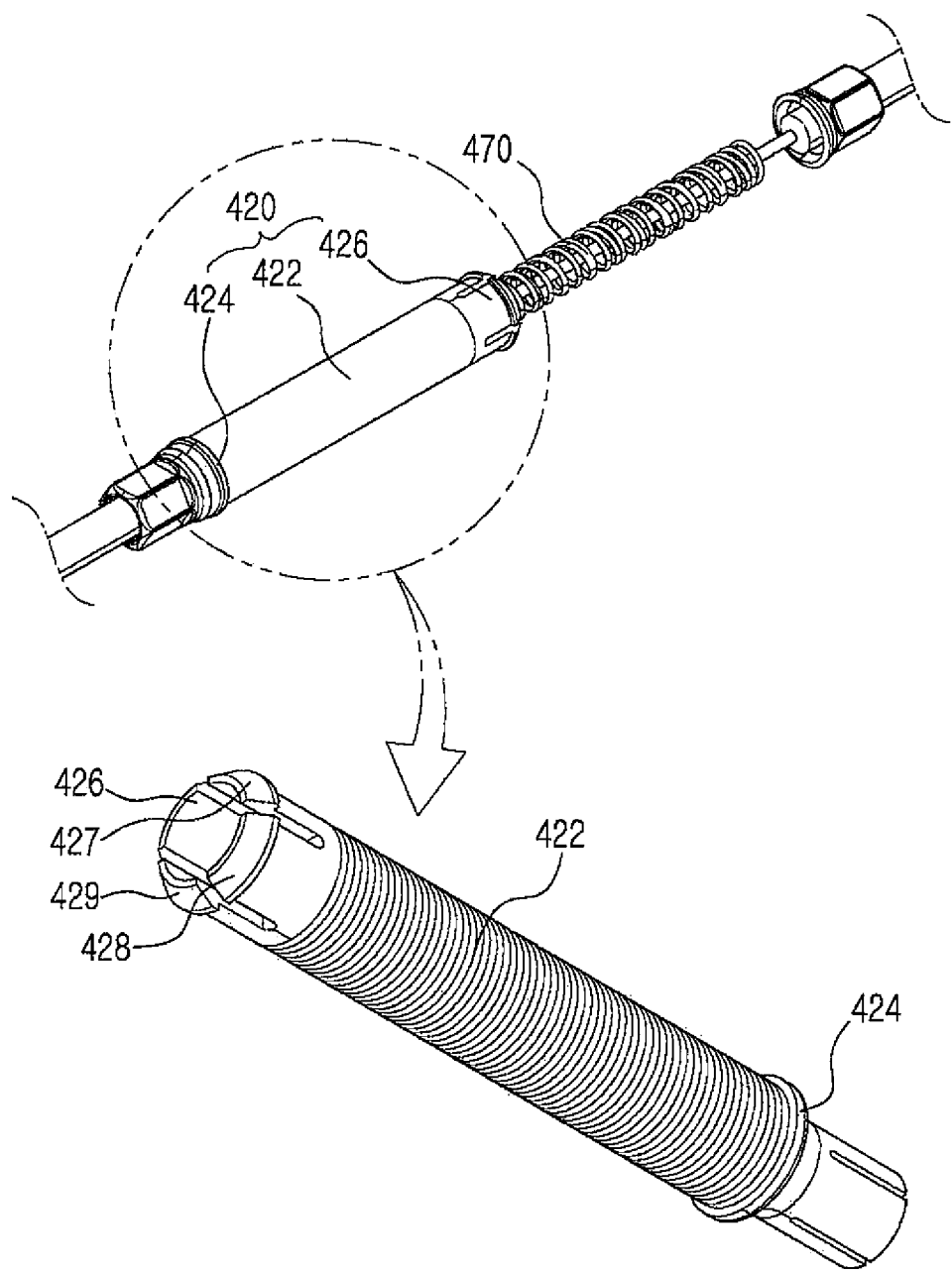

[Fig. 9]
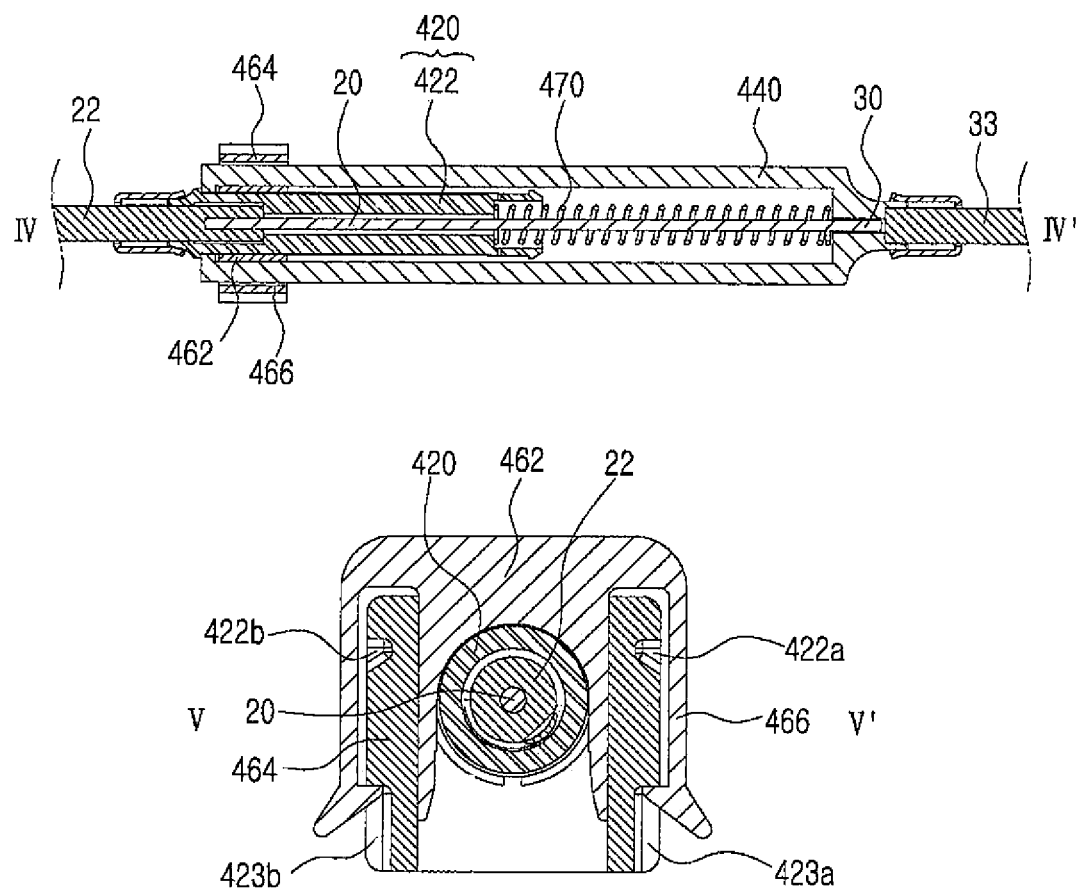

CONNECTING DEVICE FOR CABLES

CROSS REFERENCE TO RELATED APPLICATION

The present application claims priority to Korean Patent Application No. 10-2019-0026696, filed Mar. 8, 2019, the entire contents of which is incorporated herein for all purposes by this reference.

BACKGROUND OF THE INVENTION

Field of the Invention

Disclosed herein relates to a connecting device. More specifically, the present invention relates to a connecting device for cables that is configured to connect the cables to each other.

Description of the Related Art

Unless otherwise indicated herein, contents described in any item of the this Related Art are not the prior art with respect to claims of the present application and the description in the item of the present Related Art is not necessarily admitted to be the prior art.

In recent years, by providing a function to fold seats to utilize space inside a vehicle, trunk space is expanded or space, which passengers may conveniently utilize for multiple purposes inside the vehicle, is provided.

In addition, the trunk space is increased due to a need for expanded space for camping or leisure equipment for passengers using the vehicle, and the space inside the vehicle is increased through seat folding. Further, sales volume of a type of the vehicle such as an SUV, which is superior in usage of space to a sedan, has increased.

Therefore, in order to expand the trunk space by conveniently folding the seats in a second or third row inside a vehicle, it is necessary to connect a cable extending from the folding unit of the seat and a switch portion disposed on a trunk side through a connecting device.

However, since a distance between the switch portion disposed on the trunk side and the seats in the second or third row is far, and a distance difference between the cable extending from the folding unit of the seat and the switch portion occurs depending on the type of the vehicle, there is a need for a connecting device that is capable of conveniently detaching from or attaching to a cable extending from the seat and elastically adjusts the length thereof.

In this regard, Korean Patent No. 10-1537975 discloses a binding structure of a release cable for a vehicle seat fixing element, and Korean Patent Application Publication No. 10-2016-0019620 discloses a cable connecting apparatus of a trunk lid latch for vehicles.

However, the structure of the existing cable connecting device does not disclose a structure for conveniently connecting the cables between the seats in the second or third row of the vehicle and switch portion of the trunk side disposed at a considerable distance from the seats.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide a connecting device for cables, in which a connecting portion and a length adjusting portion for connecting the cables are provided to be separated from each other, and a cable of a seat side and the connecting portion are easily attached to and detached from each other.

In addition, the present invention is not limited to the technical problems as described above, and it is obvious that another technical task may be derived from the following description.

In order to achieve the above objective according to one aspect of the present invention, there is provided a connecting device for cables, the device connecting a first cable connected to a folding unit of a seat of a first direction side and a third cable connected to a switch portion at a second direction side opposite to the first direction and including: a connecting portion including a connecting unit provided therein to connect the first cable and one end of a second cable thereto and to be slidingly movable in the first or second direction; and a length adjusting portion provided on a second direction side of the connecting portion and configured to connect an opposite end of the second cable to the third cable to each other, wherein a latching-step provided on a connecting protrusion coupled to the first cable may be inserted into an inner side of the first direction side of the connecting unit and, after elastically deforming a latching-plate provided on an inner surface of the connecting unit, may be fixed to the latching-plate of being restored.

In addition, the connecting portion may further include a stopper provided to block a sliding movement of the connecting unit, by being inserted into space of the second direction side of the connecting unit when elastically moved by being pressed toward an inner side from an outer surface.

In addition, the latching-plate may be provided with a first inclined surface toward the first direction, the first, inclined surface having one end connected to the inner surface of the connecting unit and an opposite end obliquely extending toward both the inner side of the connecting unit and the second direction.

In addition, the latching-step may have one end configured to expand and extend toward the first direction from the outer side of the latching-step to provide a second inclined surface corresponding to the first inclined surface and an opposite end recessed toward an inner side from an outer side of the second inclined surface to provide a latching-surface toward the first direction, and when the second inclined surface moves toward the second direction and being moved by a predetermined distance while pushing out the first inclined surface, while elastically moving to an original position thereof, the opposite end of the latching-plate may be brought into close contact with the latching-surface.

In addition, the connecting portion may further include: a first casing having one end provided to surround the connecting unit and an opposite end provided to extend in a cylindrical shape toward the second direction; and second and third casings coupled to be slidingly movable with the first and second cables, respectively, and coupled to one end and an opposite end, respectively, of the first casing.

In addition, the length adjusting portion may include: moving unit coupled to the opposite end of the second cable and provided with an attaching unit at an outer side thereof; a fourth casing having one end including a part surrounding an outer surface of the moving unit and coupled to the moving unit in order to be slidingly movable therewith and an opposite end extending from the one end toward the second direction to be coupled to the third cable; and a hook blocking a sliding movement of the moving unit by being inserted between the fourth casing and the attaching unit so as to be coupled to both inner surfaces of the one end of the fourth casing and the attaching unit.

In addition, the length adjusting portion may further include a spring having one end coupled to the moving unit and an opposite end extending toward the second direction to be coupled to an inner surface of the opposite end of the fourth case.

According to one embodiment disclosed in the present specification, the connecting device for the cables is adjustable in length in a state of being connected to a switch portion used for folding a folding seat and has an advantage of being easily connected to the folding unit of the seat frame.

In addition, the connecting device for the cables is provided in a small cylindrical shape and has advantages such that the device is easy to install in a vehicle body frame, is easily moved for tension control of the cable, and is capable of quickly connecting to the cable of a seat frame side by a latching-step coupling method.

In addition, since effects of the present invention described above are naturally exerted by a configuration of described contents irrespective of whether or not an inventor recognizes the effects, the above-described effects are only some effects according to the contents described, and it should not be admitted that effects that an inventor comprehends or actually exist are all listed.

In addition, the effects of the present invention will be further understood by the entire description of the specification, and even if not described in explicit sentences, when there is an effect that those of ordinary skill in the art can recognize the effect through the present specification, such effect is to be seen as an effect described in this specification.

BRIEF DESCRIPTION OF THE DRAWINGS

The above and other objectives, features, and other advantages of the present invention will be more clearly understood from the following detailed description when taken in conjunction with the accompanying drawings, in which:

FIG. 1 shows a usage state diagram in a connecting device for cables according to an embodiment disclosed in the present specification;

FIG. 2 shows a perspective view of a connecting portion of FIG. 1 and a sectional view taken along the line I-I' of the perspective view;

FIG. 3 shows perspective views illustrating the connecting portion of FIG. 1;

FIG. 4 shows a sectional view taken along the line of FIG. 3;

FIG. 5 shows a sectional view taken along the line of FIG. 3;

FIG. 6 shows perspective views illustrating a connector of a connecting unit provided in the connecting portion of FIG. 1;

FIG. 7 shows perspective views illustrating a length adjusting portion of FIG. 1;

FIG. 8 shows exploded perspective views illustrating a moving unit of the length adjusting portion of FIG. 1; and FIG. 9 shows sectional views each taken along the line IV-IV' and V-V' of FIG. 7.

DETAILED DESCRIPTION OF THE INVENTION

Hereinafter, with reference to the accompanying drawings, configuration, operation, and effect of connecting device for cables that is configured to connect the cables according to an exemplary embodiment will be examined. For reference, in the following drawings, each component is omitted or schematically illustrated for convenience and clarity, and the size of each component does not reflect the actual size. In addition, the same reference numerals throughout the specification refer to the same components, and reference numerals for the same components in the individual drawings will be omitted.

FIG. 1 shows a usage state diagram in a connecting device for cables according to an embodiment disclosed in the present specification.

As shown in FIG. 1, the connecting device 100 for the cables includes a second cable 20, a connecting portion 200, and a length adjusting portion 400.

One end of the connecting device 100 for the cables is connected to a folding unit 1, by being coupled to a seat frame 3 through a first cable 10, to fold the seat frame 3 or to unfold the seat frame 3 for providing space where passengers may be seated.

An opposite end of the connecting device 100 for the cables is connected to a switch portion 2 through a third cable 30, wherein the switch portion 2 is disposed on a trunk side of a vehicle and allows a third cable 30 connected thereto to be pulled toward a second direction 6 or to be pushed toward a first direction 5 opposite to the second direction 6.

When a worker or a passenger who installs the connecting device 100 for the cables in the vehicle pulls the third cable toward the second direction 6 by operating the switch portion 2, a part of the connecting device 100 for the cables moves in the direction 6, thereby causing the folding unit 1 to operate by pulling the first cable 10 toward the second direction 6.

In a state where the trunk space and space above the seat frame 3 are communicated with each other when the seat frame 3 is folded by operation of the folding unit 1, in case that the folding unit 1 is configured to operate by driving of a motor, a worker or user may operate the switch portion 2 again to unfold the seat frame 3 upward, thereby providing a seating space in front of the seat frame 3.

Accordingly, the worker or user may drive the switch portion 2 by a simple manipulation to move the third cable 30 connected to the first cable 10 toward the second direction 6 through the connecting device 100 for cables, thereby folding or unfolding the seat frame 3.

In addition, since the connecting portion 200 and length adjusting portion 400 are provided on a third cable side by being separated from each other with the second cable 20 interposed therebetween, in a process of connecting the third cable 30 located on the trunk side and the length adjusting portion 400 to each other after working of connecting the connecting portion 200 to an end of the first cable 10, the length of the connecting device 100 for the cables may be adjusted, thereby improving working convenience.

In addition, with an outer side of the connecting portion 200 being pressed in a process of being coupled to the end of the first cable 10, the connecting portion 200 may restrict movement of a unit that is allowed to move in the first or second direction 5 or 6 inside the connecting portion 200. Accordingly, the connecting portion 200 may have an advantage in that the unit of which movement is restricted is conveniently coupled to the connecting protrusion provided with a latching-step coupled to the end of the first cable 10.

In the meantime, FIG. 2 shows a perspective view of a connecting portion of FIG. 1 and a sectional view taken along the line I-I' of the perspective view, FIG. 3 shows perspective views illustrating the connecting portion of FIG. 1, FIG. 4 shows a sectional view taken along the line II-If of FIG. 3, FIG. 5 shows a sectional view taken along the line of FIG. 3, and FIG. 6 shows perspective views illustrating a connector of a connecting unit provided in the connecting portion of FIG. 1.

As shown in FIGS. 2 to 6, the connecting portion 200 includes a connecting protrusion 210, a connecting unit 220, a first casing 230, a second casing 240, and a third casing 260.

One end of the connecting portion 200 is coupled to be detachable or attachable with the first cable 10 through the connecting protrusion 210 coupled to the end of the first cable 10, and an opposite end of the connecting portion 200 extends toward the second direction 6 and is coupled to be detachable or attachable with the second cable 20.

The connecting portion 200 is coupled to the connecting protrusion 210 in order to be slidingly movable toward the first or second direction 5 or 6 and with the protrusion 21 provided at one end of the second cable 20 in order to be slidingly movable in the first or second direction 5 or 6.

The connecting protrusion 210 includes a latching-step 212, wherein the latching-step 212 is provided with a second inclined surface 213 and a latching-surface 214.

The connecting protrusion 210 is provided with the latching-step 212 at an outer side of one end thereof, and an opposite end of the connecting protrusion 210 is reducing and extending toward the first direction 5 in a step shape and is coupled to the first cable 10 in a shape surrounding the first cable 10.

At one end corresponding to the outer surface of the second direction 6 of the latching-step 212, the second inclined surface 213 expanding and extending toward the first direction 5 at the outside of the latching-step 212 is provided. In addition, at an opposite end of the latching-step 212, a latching-surface 214 is provided, the latching-surface 214 being recessed toward the inner side corresponding to a center of the connecting protrusion 210 at the outside of the second inclined surface 213 and faces the first direction 5.

With reference to FIG. 4, the first casing 230 includes latching-steps 232, 234, and 235, and stoppers 236 and 237.

One end of the first casing 230 is provided in a cylindrical shape surrounding the connecting protrusion 210, and an opposite end of the first casing 230 surrounds the connecting unit 220 disposed therein, extends toward the second direction 6 so as to surround the second cable 20, and is coupled to be detachable or attachable with the third casing 260.

A part of one end of the first casing 230 is inserted into the second casing 240, whereby the one end of the first casing 230 is coupled to be detachable or attachable with the second casing 240, and an opposite end of the first casing 230 is inserted into the inner side of the third casing 260, thereby being coupled to be detachable or attachable with the third casing 260.

In a state where the first to third casings 230, 240, and 250 are each coupled to each corresponding adjacent casing, outer surfaces of the casings coupled to each other are coincided with each other and provided in a flat cylindrical shape. Accordingly, the space in the vehicle may be saved in a process of installing the coupled casings inside the vehicle. In addition, in a state where the coupled casings are installed inside the vehicle, sliding movement of the coupled casings may be smoothly performed, thereby having an advantage of conveniently installing the connecting device 100 for the cables.

The latching-step 232 is provided to protrude outward from the outer surface of the one end of the first casing 230 in a ring shape surrounding the outer surface of the one end of the first casing 230. In addition, when the second casing 240 moves toward the direction 6, the latching-step 232 is inserted into the coupling groove 242 provided on the inner surface of the second casing 240 while being elastically deformed, thereby being coupled to the second casing 240 by the latching-step.

Each of the latching-steps 234 and 235 is provided to protrude toward each of opposite sides from the outer surface of the opposite end of the first casing 230, and an inclined surface of each of the latching-steps 234 and 235 is provided to extend toward the second direction 6 and the inner side of the first casing 230.

Each of the latching-steps 234 and 235 is inserted into each of first and second holes 263 and 265 provided at each of latching-frames 262 and 264 provided at each of opposite sides of the third casing 260 by being inserted into an inner side positioned in the second direction 6 side of the third casing 260, thereby being coupled to be detachable or attachable with the latching-frames 262 and 264.

With reference to FIG. 5, one end of the stopper 236 is connected to the inner surface of the first casing 230 in the second direction 6 side of the outer side groove 236a that communicates the inner space and the outside of the first casing 230 with each other by penetrating through an upper part of the outer side of the first casing 230, and an opposite end of the stopper 236 extends from the outer side groove 236a toward the first direction 5 and a part thereof is protruding upward.

When a worker or user pushes the opposite end of the stopper 236 toward the inner space of the first casing 230, the opposite end of the stopper 236 moves to the inner side of the first casing 230, and when the pressure applied to the stopper 236 is withdrawn, the opposite end of the stopper 236 moves to an original position thereof.

One end of the stopper 237 is connected to the inner surface of the first casing 230 in the second direction 6 side of the outer side groove 237a that communicates the inner space and the outside of the first casing 230 with each other by penetrating through a lower part of the outer side of the first casing 230, and an opposite end of the stopper 237 extends from the outer side groove 237a toward the first direction 5 and a part thereof is protruding downward.

When a worker or user pushes the opposite end of the stopper 237 toward the inner space of the first casing 230, the opposite end of the stopper 237 moves to the inner side of the first casing 230, and when the pressure applied to the stopper 237 is withdrawn, the opposite end of the stopper 237 moves to an original position thereof.

With reference to FIGS. 4 and 5, one end of the second casing 240 is coupled to the first cable 10 in a shape surrounding an outer shell 11 covering the first cable 10, and an opposite end of the second casing 240 expands toward the second direction 6 and extends in a cylindrical shape, wherein a first groove 241 recessed toward the first direction 5 is provided on the opposite end.

A connecting protrusion 210 is disposed on an inner surface corresponding to the inner side of the first groove 241 of the second casing 240 to be coupled to the first cable 10. In addition, the connecting protrusion 210 is movable in the first or second direction 5 or 6 in a state of being coupled to the first cable 10 and may be detached from the first groove 241 by moving together with the first cable 10 in the second direction 6.

That is, the outer shell 11 and the second casing 240 coupled to the outer shell 11 are provided to be slidingly movable toward the first or second direction 5 or 6 along the extending direction of the first cable 10.

In addition, in the process of coupling the connecting protrusion 210 to the connecting unit 220 disposed inside the first casing 230, the worker or user may move the second casing 240 and the outer shell 11 toward the first direction 5 to expose the connecting protrusion 210 to the outside and may conveniently couple the connecting protrusion 210 to the connecting unit 220 by moving toward the second direction 6.

The outer surface of the second casing 240 surrounding the first cable 10 inclinedly expands toward the first cable 10 and the second direction 6 and provides a curved surface, thereby allowing the connecting portion 200 to be installed and conveniently moved in a narrow space of the vehicle. Accordingly, working convenience may be improved.

The third casing 260 includes the latching-frames 262 and 264.

One end of the third casing 260 is coupled to the first casing 230 in a shape of latching-step while surrounding a part of the outer portion of the opposite end of the first casing 230, and an opposite end of the third casing 260 is reduced toward the second direction 6 and extends by a predetermined distance.

The opposite end of the third casing 260 is coupled to the outer shell 22 surrounding the outer side of the second cable 20 at the second direction 6 side of the third casing 260 and may be slidingly movable along an extending direction of the second cable 20.

The outer surface of the third casing 260 surrounding the second cable 20 inclinedly expands toward the second cable 20 and the first direction 5 and provides a curved surface, thereby allowing the connecting portion 200 to be installed and conveniently moved in a narrow space of the vehicle. Accordingly, working convenience may be improved.

With reference to FIGS. 3 and 4, one end of the latching-frame 262 is connected to one side rim of the third casing 260, and an opposite end of the latching-frame 262 extends toward the first direction 5 in a plate shape whose cross section is curved in a semicircle shape toward one side. In addition, a rectangular first hole 263 penetrating the latching-frame 262 is provided in a center of the latching-frame 262.

Similarly, one end of the latching-frame 264 is connected to an opposite side rim of the third casing 260, and an opposite end of the latching-frame 264 extends toward the first direction 5 in a plate shape whose cross section is curved in a semicircle shape toward an opposite side. In addition, a rectangular second hole 265 penetrating the latching-frame 264 is provided in a center of the latching-frame 264.

Therefore, when the third casing 260 moves toward the first direction 5, the latching-steps 234 and 235 are each inserted into the first and second holes 263 and 265 each provided in the latching-frames 262 and 264, and the third casing 260 is coupled to the first casing 230 by the latching-step.

In addition, in a state where each of the latching-steps 232, 234, and 235 provided at one end and the opposite end of the first casing 230 is inserted correspondingly in each of the coupling groove 242, the first hole 263, and the second hole 265, the outer surface of the opposite end of the second casing 240, the outer surface of the first casing 230, the outer surface of the latching-frames 262 and 264, the outer surface of the latching-steps 234 and 235, and the outer surface of the one end of third casing 260 are provided to be coincident with each other so that the outer surface of the connecting portion 200 is provided in a smooth cylindrical shape.

Since the connecting portion 200 is provided to have the outer surface in a smooth cylindrical shape, there is an advantage in that the working convenience is improved when the connecting portion 200 is installed by slidingly moved in a limited space inside the vehicle in the installation process.

With reference to FIGS. 3 to 5, the connecting unit 220 includes latching-plates 222, 223, and 224 and a connector 226.

One end of the connecting unit 220 is provided in a cylindrical shape having an inner space opened toward the first direction 5. In addition, an opposite end of the connecting unit 220 extends by a predetermined distance toward the second direction 6, thereby being coupled to a protrusion 21 provided at one end of the second cable 20 and is provided with an insertion groove 225 in a cylindrical shape opened to the first direction 5 and the top side.

The insertion groove 225 of the connecting unit 220 is provided to be communicated with an outside space corresponding to space above a center of the connecting unit 220 and is communicated with a cable hole 225a penetrating an upper part of the one end of the connecting unit 220. Accordingly, the connecting protrusion 210 and the first cable 10 may be inserted into the inner side of the connecting unit 220 through the insertion groove 225 and the cable hole 225a at a position above the connecting unit 220.

The connecting unit 220 is coupled to be slidingly movable toward the first or second direction 5 or 6 in the inner space of the first casing 230. However, when the opposite end of each of the stoppers 236 and 237 moves to the inner space of the first casing 230, the connecting unit 220 is brought into close contact with the opposite end of each of the stoppers 236 and 237 and the sliding movement thereof toward the second direction 6 is restricted.

When the opposite end of each of the stoppers 236 and 237 moves to an original position thereof, the connecting unit 220 may be slidingly moved toward the second direction 6 along the inner surface of each of the stoppers 236 and 237.

In a state where the movement toward the second direction 6 of the connecting unit 220 is restricted because of the opposite end of each of the stoppers 236 and 237 being moved to the inner space of the first casing 230, the connecting protrusion 210 is easily inserted into the insertion groove 225.

In a process of inserting the connecting protrusion 210 into the insertion groove 225, the latching-step 212 elastically deforms the latching-plates 222, 223, and 224 provided on the inner surface of the connecting unit 220 and then moves by a predetermined distance. Thereafter, the latching-plates 222, 223, and 224 being restored are brought into close contact with the latching-surface 214 to restrict the connecting protrusion 210 from moving in the first direction 5.

Therefore, in a state where the movement of the connecting unit 220 is restricted because of the opposite end of each of the stoppers 236 and 237 being pressed, the worker or user may insert the connecting protrusion 210 into the insertion groove 225 and conveniently and firmly couple the protrusion 210 with the connecting unit 220.

With reference to FIG. 3, one end of the latching-plate 222 is connected to an outer surface of the connecting unit 220 corresponding to the first direction 5 side of a flank surface hole 222a penetrating an upper part of one side of the connecting unit 220 in a rectangular shape. In addition, an opposite end of the latching-plate 222 obliquely extends toward both the inner side of the connecting unit 220 and the second direction 6 in a plate shape.

One end of the latching-plate 223 is connected to an inner surface of the connecting unit 220 corresponding to the first direction 5 side of a flank surface hole 222*a* penetrating an upper part of an opposite side of the connecting unit 220 in a rectangular shape. In addition, an opposite end of the latching-plate 223 obliquely extends toward both the inner side of the connecting unit 220 and the second direction 6 in a plate shape.

One end of the latching-plate 224 is connected to an inner surface of the connecting unit 220 corresponding to the first direction 5 side of a lower hole 224*a* penetrating a lower part of the connecting unit 220 in a rectangular shape. In addition, an opposite end of the latching-plate 224 obliquely extends toward both the inner side of the connecting unit 220 and the second direction 6 in a plate shape.

Therefore, with reference to FIG. 5, when the connecting protrusion 210 moves toward the second direction 6 and is inserted into the insertion groove 225, the second inclined surface 213 of the latching-step 212 is brought into close contact with the inclined surface of the first direction 5 side of each of the latching-plates 222, 223, and 224, and elastically moves the opposite end of each of the latching-plates 222, 223, and 224 toward the second direction 6.

When the second inclined surface 213 of the latching-step 212 moves further by a predetermined distance in a state after elastically moving the inclined surface of the first direction 5 side of each of the latching-plates 222, 223, and 224, the opposite end of each of the latching-plates 222, 223, and 224 is brought into close contact with the latching-surface 214 while moving to the original position thereof, and the connecting protrusion 210 is fastened to the connecting unit 220.

On the other hand, after slidingly moving the second casing 240 toward the first direction 5 by separating the second casing 240 from the first casing 230 as a first process of separating the connecting protrusion 210 from the connecting unit 220, the operator or user may move the connecting unit 220 to the outside of the first casing 230 by pulling the connecting protrusion 210 toward the first direction 5.

In addition, in a state where the connecting unit 220 is detached from the first casing 230, when the connecting protrusion 210 is moved upward after being moved toward the second direction 6 by a predetermined distance, the connecting protrusion 210 and the first cable 10 are separated from the connecting unit 220 through the insertion groove 225 and the cable hole 225*a*.

With reference to FIGS. 3 and 6, the connector 226 includes latching-steps 227, 228, and 229.

One end of the connector 226 is provided to be detachable or attachable to the opposite end of the connecting unit 220 and is coupled to the protrusion 21 of the second cable 20 by being provided at the opposite end of the connecting unit 220.

The one end of the connector 226 is provided in a cylindrical shape, and the opposite end of the connector 226 extends by a predetermined distance toward the second direction 6, wherein a part of the outer surface of the opposite end expands and is connected to the outer surface of the connecting unit 220.

The latching-step 227 is provided to inclinedly protrude toward one side from an upper part of the outer surface of the one side of the one end of the connector 226 and is inserted into and fastened to a side hole 227*a* penetrating through an outer surface of one side of the second direction 6 side of the connecting unit 220.

The latching-step 228 is provided to inclinedly to protrude toward another side from an upper part of the outer surface of another side of the one end of the connector 226 and is inserted into and fastened to a side hole 226*a* penetrating through an outer surface of another side of the second direction 6 side of the connecting unit 220.

The latching-step 229 is provided to inclinedly protrude toward a lower side from a lower part of the outer surface of the one end of the connector 226 and is inserted into and fastened to a side hole 229*a* penetrating through a lower outer surface of the second direction 6 of the connecting unit 220.

Meantime, FIG. 7 shows perspective views illustrating a length adjusting portion of FIG. 1, FIG. 8 shows exploded perspective views illustrating a moving unit of the length adjusting portion of FIG. 1, and FIG. 9 shows sectional views each taken along the line IV-IV' and V-V' of FIG. 7.

As shown in FIGS. 7 to 9, the length adjusting portion 400 includes a moving unit 420, a fourth casing 440, and a hook 460.

In a state of being separated from the connecting portion 200 with the second cable 20 interposed therebetween, one end of the length adjusting portion 400 is coupled to an opposite end of the second cable 20 so as to be slidingly movable toward the first or second direction 5 or 6.

An opposite end of the length adjusting portion 400 extends by a predetermined distance toward the second direction 6, thereby being coupled to the third cable 30 and may restrict the sliding movement of the second cable 20 through a hook 460 provided to be detachable or attachable.

The moving unit 420 includes an attaching unit 422, a latching-step 424, and elastic plates 426, 427, 428, and 429.

One end of the moving unit 420 is coupled to the opposite end of the second cable 20, and an opposite end of the moving unit 420 extends in a cylindrical shape toward the second direction 6 and is provided to be slidingly movable toward the first or second direction 5 or 6 inside the length adjusting portion 400.

The outer surface adjacent to the one end of the moving unit 420 is provided to extend outward to provide the latching-step 424, and the outer surface of the central part of the moving unit 420 is provided with a threaded or ring-shaped protrusions surrounding the outer surface spaced apart from each other at uniform intervals along an extending direction of the moving unit 420.

The opposite end of the moving unit 420 is provided with elastic plates 426, 427, 428, and 429 in a state of being separated from each other, wherein each of the elastic plates extends in a plate shape toward the second direction 6 from a rim of the opposite end of the moving unit 420 and provided with a latching-step at an end thereof.

One end of each of the elastic plates 426, 427, 428, and 429 is connected to the opposite end of the moving unit 420 to surround an inner space inside the mobile unit 420, provided to be separated from each other with a predetermined space therebetween. In addition, an opposite end of each of the elastic plates 426, 427, 428, and 429 extends in the plate form toward the second direction 6.

A part of the opposite end of each of the elastic plates 426, 427, 428, and 429 protrudes outward, thereby providing a latching-step providing an inclined surface extending toward both the second direction 6 and the inner side of the moving unit 420. In addition, when inserted into a hole of the first direction 5 side of the fourth casing 440 to be described later, the inclined surface of each of the elastic plates is inserted into the fourth casing 440 while being elastically deformed.

One end of the fourth casing 440 is provided in a square plate shape having a hole provided at a center thereof, and an opposite end of the fourth casing 440 is provided in a plate shape such that each of parts of opposite flank surfaces of the fourth casing 440 extends toward the second direction 6 and then extends toward each other to be coupled to the third cable 30.

Therefore, an inner space of the rectangular parallelepiped shape communicated with an outer space corresponding to the upper part and the lower part thereof is provided in the inside of the fourth casing 440. In addition, the opposite end of the moving unit 420 is inserted into the inner space of the fourth casing 440 through the hole and coupled to the fourth casing 440 so as to be slidingly movable in the first or second directions 5 or 6.

Each of mounting grooves 422a and 422b inclinedly recessed from each of opposite surfaces toward the inner upper portion of the fourth casing 440 is provided at an upper end of each of the opposite surfaces of one end of the fourth casing 440. In addition, a part of each of outer portions of opposite bottom surfaces of the fourth casing 440 is recessed toward an upper side on a lower side of each of opposite flank surfaces of one end of the fourth casing 440 so that each of coupling grooves 423a and 423b in a rectangular parallelepiped shape is provided.

Specifically, when the moving unit 420 is inserted into the inner side of the fourth casing 440, the inclined surface of the latching-step provided on the opposite end of each of the elastic plates 426, 427, 428, and 429 is deformed inward while being brought into close contact with the inner surface of the fourth casing 440 located in the hole. In addition, when the moving unit 420 moves further toward the second direction 6, the above-mentioned inclined surface of the latching-step moves to an original position thereof.

The outer surface on which the attaching unit 422 of the moving unit 420 is provided is slidingly movable toward the first or second direction 5 or 6 through the hole. In addition, when the latching-step 424 reaches the one end of the fourth casing 440, the latching-step 424 is brought into close contact with the fourth casing 440 corresponding to a rim of the hole, thereby restricting the movement of the moving unit 420 toward the second direction 6.

On the contrary, when the moving unit 420 moves in the first direction 5 by the vibration of the vehicle body or the external force, the latching-step of each of the elastic plates 426, 427, 428, and 429 is brought into close contact with the inner surface of the one end of the fourth casing 440 corresponding to the rim of the hole, thereby preventing the moving unit 420 from being separated from the fourth casing 440.

Therefore, when the hooks 460 are broken or not mounted, the latching-step of each of the elastic plates 426, 427, 428, and 429 may prevent inoperability of the switch unit 2 from occurring due to detachment of the moving unit 420 from the fourth casing 440 or may prevent the moving unit 420 from being detached from the fourth casing 440, thereby improving the working convenience.

In a state where the moving unit 420 is inserted into the fourth casing 440 through the hole, insertion spaces are provided between opposite inner surfaces of the fourth casing 440 and the attaching unit 442. In addition, a part of the hook 460 is inserted into the insertion spaces and coupled to the attaching unit 422.

The hook 460 includes a pressing unit 462 and fixing plates 464 and 466.

The pressing unit 462 is divided into opposite sides of the hook 460 and extends from the center toward the lower side of the hook 460, thereby being configured to be brought into close contact with the attaching unit 422 while surrounding a part of an upper side and opposite flank surfaces of the attaching unit 422 provided on the outer surface of the moving unit 420.

The inner surface of the pressing unit 462 is provided with threads or protrusions that engage with the threads or protrusions that may be provided in the attaching unit 422, whereby the inner surface of the pressing unit 462 is firmly coupled to the attaching unit 422 while being brought into close contact with the attaching unit 422. In addition, when the hook 460 is moved toward the upper side, the attaching unit 422 and the pressing unit 462 may be conveniently detached.

Threads or protrusions are provided on the outer flank surfaces of the pressing unit 462, thereby being engaged with the threads or protrusions provided on the opposite inner surfaces of the fourth casing 440 that are brought into close contact with the outer flank surfaces of the pressing unit 462. In addition, when the hook 460 is moved toward the upper side, the pressing unit 462 is easily separated from the opposite inner surfaces of the fourth casing 440.

The fixing plate 466 extends toward the lower side in a separated state at one side of the pressing unit 462, and a part of the lower end of the fixing plate 466 protrudes toward an opposite side of the pressing unit 462, thereby being inserted into and fixed to the coupling groove 423a in a state where the pressing unit 462 is coupled to the moving unit 420.

The fixing plate 466 extends toward the lower side in a separated state at one side of the pressing unit 462, and a part of the lower end of the fixing plate 466 protrudes toward an opposite side of the pressing unit 462, thereby being inserted into and fixed to the coupling groove 423a in a state where the pressing unit 462 is coupled to the moving unit 420.

A part of the lower outer surface of the fixing plate 466 is inclined toward a lower outer side to form a handle, and the user may conveniently separate the fixing plate 466 from the coupling groove 423a by pulling the handle to the outer side.

The fixing plate 464 extends toward the lower side in a separated state at an opposite side of the pressing unit 462, and a part of the lower end of the fixing plate 464 protrudes toward the one side of the pressing unit 462, thereby being inserted into and fixed to the coupling groove 423b in a state where the pressing unit 462 is coupled to the moving unit 420.

A part of the lower outer surface of the fixing plate 464 is inclined toward a lower outer side to form a handle, and the user may conveniently separate the fixing plate 464 from the coupling groove 423b by pulling the handle to the outer side.

Therefore, when the hook 460 is coupled to the moving unit 420 and the fourth casing 440, by the inner surfaces of the coupling grooves 423a and 423b located at the first direction 5 side of the fourth casing 440, movement of the fixing plates 464 and 466 in the second direction 6 is restricted, and the movement of the moving unit 420 in the second direction 6 is also restricted.

In addition, when the hook 460 is coupled to the moving unit 420 and the fourth casing 440, since the surface of the pressing unit 462 of the first direction 5 side of the hook 460 is brought into close contact with the inner surface of the one end of the fourth casing 440 corresponding to the rim of the hole of the fourth casing 440 in the insertion space, movement of the hook 460 toward the first direction 5 is restricted.

Meanwhile, when the fixing plates 464 and 466 move away from the coupling grooves 423a and 423b, respectively, and move upward, the fixing plates 464 and 466 may be inserted into the mounting grooves 422a and 422b, respectively. In this case, the hook 460 is temporarily fixed to the upper side of the one end of the fourth casing 440, thereby being prevented from being lost. In addition, when the position of the second cable 20 is adjusted by the movement of the moving unit 420, the position of the moving unit 420 may be fixed by quickly moving the hook 460 toward the lower side.

One end of a spring 470 is coupled to the outer shell 22 surrounding the second cable 20 inside the moving unit 420 through the opposite end of the moving unit 420, and an opposite end of the spring 470 is coupled to the inner surface of the opposite end of the fourth casing 440 gone by the opposite end of the moving unit 420.

The elastic force of the spring 470 is provided to pull the moving unit 420 coupled to the spring 470 toward the second direction 6. When the connecting protrusion 210 is coupled to the connecting unit 220, the elastic force of the spring 470 automatically pulls the second cable 20 toward the second direction 6, thereby maintaining the tension of the first and second cables 10 and 20 connected to the spring 470.

Although the exemplary embodiments of the present invention have been described above with reference to the accompanying drawings, the configuration described in the embodiments and drawings described herein is only one of the most preferred embodiments of the present invention and does not represent all of the technical idea of the present invention. Accordingly, it is to be understood that there may be various equivalents and variations in place at the time of the present application. Therefore, the embodiments described above are to be understood as illustrative and not restrictive in all respects, and the scope of the present invention is indicated by the following claims rather than the detailed description. Furthermore, the meaning and scope of the claims and all changes or modifications derived from an equivalent concept thereof should be construed as being included in the scope of the present invention.

What is claimed is:

1. A connecting device for cables, the device connecting a first cable connected to a folding unit of a seat of a first direction and a third cable connected to a switch portion at a second direction opposite to the first direction and comprising:
    a connecting portion including a connecting unit provided therein to connect the first cable and one end of a second cable thereto and to be slidingly movable in the first direction or the second direction; and
    a length adjusting portion provided on the second direction of the connecting portion and configured to connect an opposite end of the second cable to the third cable to each other,
    wherein a latching-step provided on a connecting protrusion coupled to the first cable is inserted into an inner side of the first direction of the connecting unit and, after elastically deforming a latching-plate provided on an inner surface of the connecting unit, is fixed to the latching-plate of being restored; and
    wherein the connecting portion further comprises a stopper provided to block a sliding movement of the connecting unit by being inserted into space of the second direction of the connecting unit when elastically moved by being pressed toward an inner side from an outer surface.

2. The device of claim 1, wherein the latching-plate is provided with a first inclined surface toward the first direction, the first inclined surface having one end connected to the outer surface of the connecting unit and an opposite end obliquely extending toward both the inner side of the connecting unit and the second direction.

3. The device of claim 2, wherein the latching-step has one end configured to expand and extend toward the first direction from an outer side of the latching-step to provide a second inclined surface corresponding to the first inclined surface and an opposite end recessed toward an inner side from the outer side of the second inclined surface to provide a latching-surface toward the first direction, and
    when the second inclined surface moves toward the second direction and being moved by a predetermined distance while pushing out the first inclined surface, while elastically moving to an original position thereof, the opposite end of the latching-plate is brought into close contact with the latching-surface.

4. The device of claim 1, wherein the connecting portion further comprises:
    a first casing having one end provided to surround the connecting unit and an opposite end provided to extend in a cylindrical shape toward the second direction; and
    second and third casings coupled to be slidingly movable with the first and second cables, respectively, and coupled to the one end and the opposite end, respectively, of the first casing.

5. The device of claim 1, wherein the length adjusting portion comprises:
    a moving unit coupled to the opposite end of the second cable and provided with an attaching unit at an outer side thereof;
    a fourth casing having one end including a part surrounding an outer surface of the moving unit and coupled to the moving unit in order to be slidingly movable therewith and an opposite end extending from the one end toward the second direction to be coupled to the third cable; and
    a hook blocking a sliding movement of the moving unit by being inserted between the fourth casing and the attaching unit so as to be coupled to both inner surfaces of the one end of the fourth casing and the attaching unit.

6. The device of claim 5, wherein the length adjusting portion further comprises a spring having one end coupled to the moving unit and an opposite end extending toward the second direction to be coupled to an inner surface of the opposite end of the fourth casing.

7. A connecting device for cables, the device connecting a first cable connected to a folding unit of a seat of a first direction and a third cable connected to a switch portion at a second direction opposite to the first direction and comprising:
    a connecting portion including a connecting unit provided therein to connect the first cable and one end of a second cable thereto and to be slidingly movable in the first direction or the second direction and a stopper provided to block a sliding movement of the connecting unit by being inserted into space of the second direction of the connecting unit when elastically moved by being pressed toward an inner side from an outer surface;
    a length adjusting portion provided on the second direction of the connecting portion and configured to connect an opposite end of the second cable to the third cable to each other;
    wherein a latching-step provided on a connecting protrusion coupled to the first cable is inserted into an inner side of the first direction of the connecting unit and, after elastically deforming a latching-plate provided on an inner surface of the connecting unit, is fixed to the latching-plate of being restored; and wherein the length adjusting portion comprises:

a moving unit coupled to the opposite end of the second cable and provided with an attaching unit at an outer side thereof;

a fourth casing having one end including a part surrounding an outer surface of the moving unit and coupled to the moving unit in order to be slidingly movable therewith and an opposite end extending from the one end toward the second direction to be coupled to the third cable; and a hook blocking a sliding movement of the moving unit by being inserted between the fourth casing and the attaching unit so as to be coupled to both inner surfaces of the one end of the fourth casing and the attaching unit.

8. The device of claim 7, wherein the latching-plate is provided with a first inclined surface toward the first direction, the first inclined surface having one end connected to the outer surface of the connecting unit and an opposite end obliquely extending toward both the inner side of the connecting unit and the second direction.

9. The device of claim 8, wherein the latching-step has one end configured to expand and extend toward the first direction from an outer side of the latching-step to provide a second inclined surface corresponding to the first inclined surface and an opposite end recessed toward an inner side from the outer side of the second inclined surface to provide a latching-surface toward the first direction, and when the second inclined surface moves toward the second direction and being moved by a predetermined distance while pushing out the first inclined surface, while elastically moving to an original position thereof, the opposite end of the latching-plate is brought into close contact with the latching-surface.

10. The device of claim 7, wherein the connecting portion further comprises:

a first casing having one end provided to surround the connecting unit and an opposite end provided to extend in a cylindrical shape toward the second direction; and second and third casings coupled to be slidingly movable with the first and second cables, respectively, and coupled to the one end and the opposite end, respectively, of the first casing.

* * * * *